United States Patent [19]
Souers et al.

[11] Patent Number: 4,972,884
[45] Date of Patent: Nov. 27, 1990

[54] METHOD AND APPARATUS FOR UNIFORMLY LOADING PARTICULATE MATERIAL INTO CYLINDRICAL BEDS

[75] Inventors: Steven A. Souers, Port Neches, Tex.; Bruce E. Powell, Kensington, Calif.

[73] Assignee: Chevron Research & Technology Company, San Francisco, Calif.

[21] Appl. No.: 428,405

[22] Filed: Oct. 27, 1989

Related U.S. Application Data

[63] Continuation of Ser. No. 215,596, May 11, 1988, abandoned, which is a continuation-in-part of Ser. No. 4,316, Jan. 7, 1987, abandoned, which is a continuation of Ser. No. 679,154, Dec. 7, 1984, abandoned.

[51] Int. Cl.$^5$ .................................................. B01J 8/08
[52] U.S. Cl. ........................................ 141/1; 141/286; 422/219; 414/301; 239/665
[58] Field of Search ................... 141/1, 286; 422/219; 414/301; 239/665, 673, 682, 687, 223, 224, 225, 668, 681

[56] References Cited

U.S. PATENT DOCUMENTS

| | | | |
|---|---|---|---|
| 3,804,273 | 4/1974 | Uhl | 422/219 |
| 3,972,686 | 8/1976 | Johnson et al. | 422/219 |
| 4,277,205 | 7/1981 | Meunier | 414/301 |
| 4,433,707 | 2/1984 | Farnham | 414/301 |
| 4,437,613 | 3/1984 | Olson | 414/301 |

FOREIGN PATENT DOCUMENTS

| | | | |
|---|---|---|---|
| 1457867 | 8/1971 | Fed. Rep. of Germany | 239/687 |
| 378165 | 6/1973 | U.S.S.R. | 239/687 |
| 2168330 | 6/1986 | United Kingdom | |

*Primary Examiner*—Kenneth M. Schor
*Attorney, Agent, or Firm*—Burns, Doane, Swecker & Mathis

[57] ABSTRACT

A method for simultaneously distributing catalyst particles across the full diameter of catalyst bed with a single rotor is disclosed. The bed has substantially uniform high density by forming a multiplicity of annular rings of catalyst concentric with the vessel or bed center. Such action is achieved without varying rotor speed by deflecting catalyst from a feed hopper into a plurality of arcuate sectors or portions of different radial lengths on a rotating disk-like member. Preferably, each arcuate portion has a volume proportional to one of the annular areas of the bed within the cross-sectional area of the vessel. The desired volume is formed by the radial length of the arcuate sector, its included angle on the disk, and the height of the vanes separating adjacent sectors. The volume is maintained by flow of catalyst into the sectors at a rate to maintain such volumes full at the constant speed of rotation of the disk-like member so that each annular ring is simultaneously formed across the bed with minimum overlap.

7 Claims, 3 Drawing Sheets

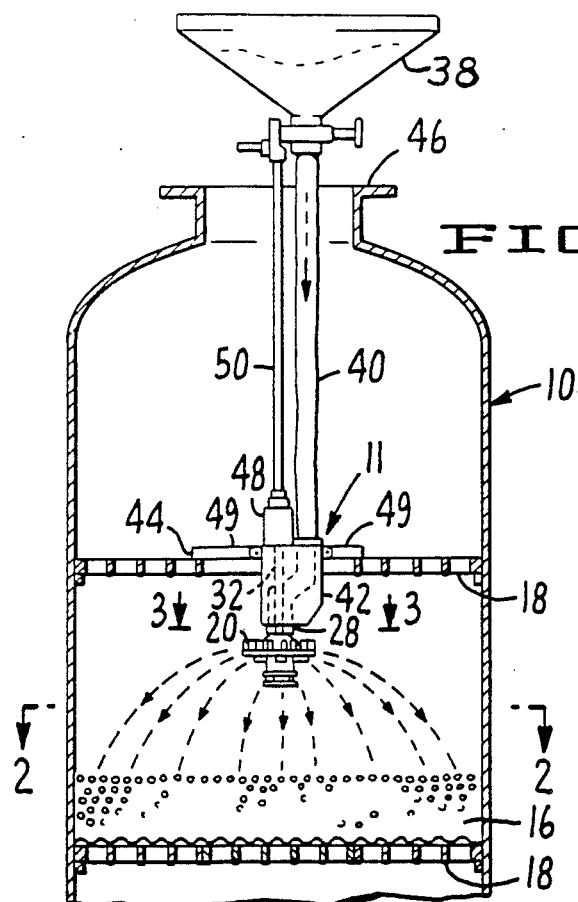
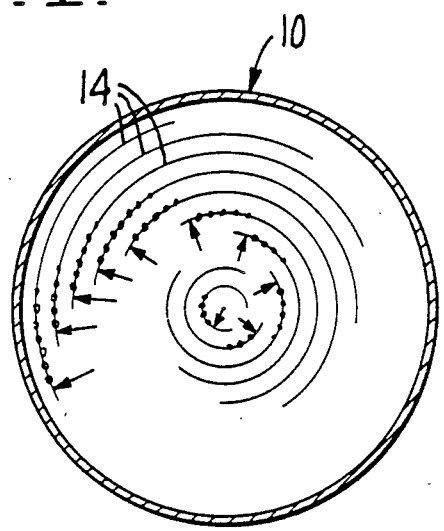
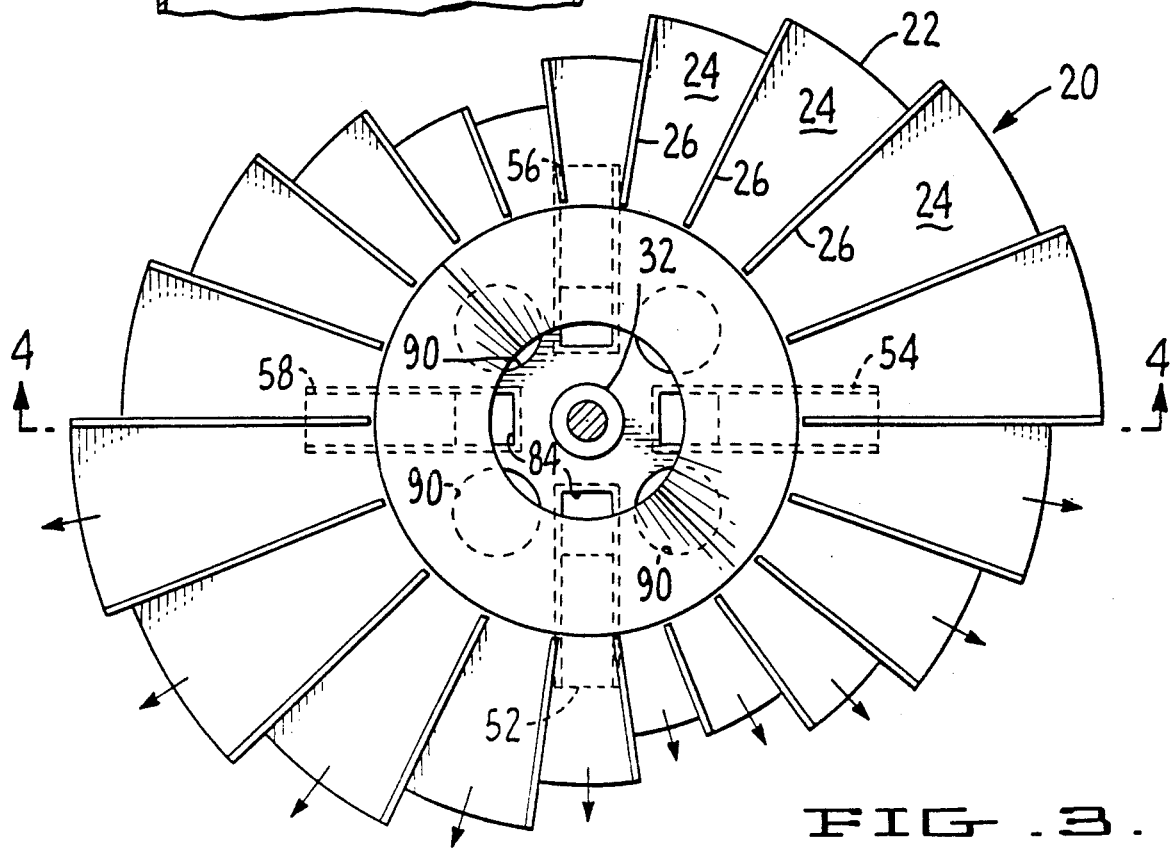
FIG. 1.
FIG. 2.
FIG. 3.

METHOD AND APPARATUS FOR UNIFORMLY LOADING PARTICULATE MATERIAL INTO CYLINDRICAL BEDS

This application is a continuation of application Ser. No. 215,596 filed May 11, 1988 abandoned which in turn is a continuation-in-part of application Ser. No. 004,316, filed Jan. 7, 1987 now abandoned which in turn was a continuation of application Ser. No. 679,154 filed Dec. 7, 1984, now abandoned.

FIELD OF THE INVENTION

The present invention relates to a method of, and apparatus for, uniformly loading particulate material into a cylindrical bed or vessel. More particularly, it relates to Catalyst Oriented Packing (COP) loading of catalytic reaction beds by uniformly distributing catalyst particles, or the like, over a large diameter cylindrical vessel by simultaneously flowing catalyst into multiple concentric rings of catalyst particles over the full circular area of the catalyst bed. The invention is primarily directed to assuring that catalyst such as cylindrical extrudate catalyst having a high angle of repose, will pack uniformly in a bed with a high ratio of catalyst to volume.

It is the particular object of the present invention to increase the packed density of particles having a high angle of repose, including spheroidal particles, so that the bed is simultaneously formed by a plurality of concentric rings across the full diameter of the vessel. Multiple annular rings of particles, such as catalyst, are formed by rotation at a substantially uniform speed of a single rotary disk-like member or rotor having multiple radial partitions which divide the volume of catalyst flow from an overhead flow pipe into a multiplicity of radial segments, each of such segments having different radii and volumes proportional to the radius and volume of one of the concentric catalyst rings. The resulting exit velocity and volume of catalyst particles flowing from each segment or sector of the disk distribution surface creates a plurality of different radial throw distances within the vessel to lay down a bed formed by a plurality of annular bands of catalyst. Since all segments of the disk turn at the same speed, concentric rings of catalyst are simultaneously cast into the vessel so that they simultaneously settle into adjacent annular rings. Such annular rings are desirably relatively narrow in radial width, but of progressively different radial distances from the axis of the vessel to form a multiplicity of concentric rings to cover the catalyst bed uniformly. Further with flow of catalyst onto the disk sufficient to fill each segment, the total volume of each deposited ring is proportional to the volume of the disk segments as determined by the included circumferential angle between the spaced radial partitions, the axial height of the partitions, and the radial length of each sector. The outer radius of each ring is proportional in general to the radial length of the sector and the speed of rotation of the disk. The radial width of each band is in general proportional to the circumferential width of the corresponding disk sector.

BACKGROUND OF THE INVENTION

Catalytic reactor vessels having one or more fixed catalyst beds are now commonly filled by using a catalyst distributor. Such a technique is known as Catalyst Oriented Packing (frequently referred to as COP loading) and is particularly useful to produce uniformity in the permeability and overall density of the catalyst bed. In current catalytic processing, catalyst particles are generally manufactured by extrusion in the form of cylindrical rods of 1/32" to ¼" diameter. The rods are then broken into lengths having a diameter to length ratio of about 1 to 4. Such extrudates are typically formed of alumina, silica-alumna or synthetic or natural zeolitic materials and are substantially less expensive to produce then spherical catalyst. However, such extrudate particles have a high angle of repose; the angle at which a free-standing pile of material is stable. Consequently, they are difficult to distribute evenly over a large diameter cylindrical vessel. Further, due to differences in size of such particles, as well as chipping and breaking during both manufacture and loading into a process reactor, they tend to "classify" or separate if the bed is filled by gravity alone from a central point in the vessel.

The primary purpose of COP loading is to minimize void spaces and consequently local "hot spots" which can occur during exothermic reactions of hydrocarbons with the catalyst particles. Additionally, increased packed density of the solid particulate material, catalyst particles, improves the flow distribution of reactants within the vessel. Further, increased bed density limits settling of the bed when the reactor is brought on stream and subjected to hydraulic forces by fluid flow through the reactor. In general, the amount of catalyst can be increased several percent in an existing vessel. Conversely, several percent less reactor volume is required for the same amount of catalyst in a new vessel.

In general, previously known catalyst oriented-loading apparatus included a distributor disk having a uniform diameter and a plurality of radial blades or fin members of uniform radial length equally spaced from each other circumferentially. Such blades or fins on top of the rotating disk randomly fling catalyst from the edge of the disk with catalyst thrown different radial distances depending upon the radial portion of the blade acting on the particle. In general, the distributor is either a cone shaped member or a flat circular plate. Since the distance the catalyst is thrown is proportional only to the disk speed, the speed of the distributor must be varied in order to distribute catalyst at different radial distances across the entire cross-sectional area of the bed by flinging catalyst from the edge of the disk. Where the disk is a flat plate having vanes formed thereon, a few holes are formed in the plate so that some of the catalyst particles fall directly downwardly through the rotating member toward the center of the reactor vessel.

U.S. Pat. No. 3,804,273, Uhl, is directed to apparatus for loading a catalyst bed with a radial distributor having a single conical surface. The only method of distributing catalyst across the full bed diameter is to increase and decrease the speed of the rotating disk. A particular disadvantage of a conical surface is that, depending on the angle of the cone, speed does not greatly vary the width of the catalyst ring that can be cast from its edge. Accordingly, the utility of such disks is generally limited to small diameter vessels.

U.S. Pat. No. 3,972,868, Johnson, et al., discloses a flat disk having vanes and a plurality of slots or holes through which some of the catalyst may fall near the center of the bed; the remainder of the catalyst is thrown toward the vessel side. This system also requires variation in the speed of the rotating disk to load catalyst so that it covers the entire level of a catalyst reactor bed.

A particular disadvantage of such prior flat disk arrangements lies in the fact that at a given speed the catalyst is thrown by a few fins or radial ribs into a circular or annular mound which tends to classify catalyst particles falling on it. The larger particles roll to the bottom and outside of the mound while the smaller particles stop on the mound itself. While to a certain extent, these difficulties are alleviated by varying the speed of the rotating disk, slowing disk speed significantly increases the loading time for the reactor bed, because loading rate is in general proportional to such speed. On the other hand, high speed of such a disk having only a few fins or vanes results in catalyst flying off the disk without sufficient residence time for the fins to contact and control the radial throw distance of the particles. Additionally, it is difficult to control disk speed to achieve the desired variations in radial throw distance because the interior of the vessel above such a bed is usually too full of dust to permit the operator to actually see the catalyst bed from the loader. Accordingly, it is necessary to determine the probable level of distribution by the number of drums of catalyst that have been loaded at a given bed level. Such a procedure is time-consuming and not necessarily accurate enough to permit level filling of the bed. In fact, it is general practice to fill the bed at the outer edge higher than necessary (say 6 to 12 inches); and then by slowing the speed of the distributor disk, the height of the center of the bed is filled to a level above that at the outer edge by a similar amount. The speed is alternately increased and decreased up the reactor as the depth of the bed or beds is increased throughout the reactor. The problem is further aggravated where the vessel contains several separate beds, each supported by a separate support "screen" forming "vessel internals" so that the lower beds must be filled through accessways in the center of the overlying bed support. Visual inspection is thus made more difficult.

U.S. Pat. No. 4,306,829, Loutaty, et al., discloses a distributor for catalyst particles in a reactor or grain storage in a silo. The distributor includes flexible straps pivotally supported by hooks along the length of a drive shaft. The straps may be formed of reinforced rubber and are either of equal length or progressively longer away from the feed hopper discharge. The examples indicate the system to be satisfactory for filling a model of a reactor vessel 60 cm (about 2 feet) in diameter. It appears that the active lengths of the rotating straps vary in diameter with the speed of the drive shaft and their interaction with falling catalyst particles. Efficient loading of vessels with each of the above-noted arrangements has been limited to relatively small diameter reactors, for reasons noted above.

U.S. Pat. No. 4,433,707, Farnham, assigned to the assignee of the present invention, discloses a method and apparatus for uniformly filling a reactor vessel at each level with an even distribution of catalyst particles from the center of the vessel to its outer wall by using a plurality of axially spaced disks of differing diameters rotated at the same speed by a single drive shaft. Desirably, three conical disks are used with the largest diameter nearest the supply hopper feed tube. The upper disks include a central opening to permit catalyst to be fed to each of the lower disks. Because the disks are of different diameters, each spreads catalyst to a different area around the vessel with the drive shaft rotating at constant speed. Each disk includes vanes equally spaced circumferentially from each other to fling or cast catalyst into three bands. Such a system is quite satisfactory for delivery of catalyst to vessels of smaller diameter and deep beds, where adequate "head" room is available at the top of the vessel or the internal bed supports above each of several beds. However, the method is also limited to laying down only a few annular rings simultaneously, without changing rotor speed.

Federal Republic of Germany Patent No. 2,703,329 issued March, 1978 discloses another particle loading system using axially spaced multiple disks rotated by a common drive shaft. The mode of operation is similar to the above-noted Farnham patent.

West German patent application No. 1,457,867 filed Dec. 29, 1964 (laid open Aug. 12, 1971) discloses a fertilizer spreader which includes three stepped disks of different diameters. Each disk includes curved vanes of differing lengths. Alternatively, a single disk includes six segments, each having a radially tapered diameter with three different curved slinger vanes. The three vanes of each disk or segment have different curvatures and slopes to further assure overlap of the bands of fertilizer laid down simultaneously. The longer vanes in either form have a higher angle to the vertical axis of the disk and smaller curvature in the plane of the disk than the other two sets of vanes. The shortest vanes correspondingly have a lower angle to vertical and a larger radius of curvature in the disk plane. The intermediate length vanes are likewise intermediate the vertical angle and radius of curvature of the other two vanes. Each vane, whether on a single disk or on three disks, begins at a different radial distance from the axis of the disk. This also assures the desired coaxial overlap of the three bands of fertilizer laid down on the earth's surface as the spreader moves transverse to the axis of rotation of the disk, particularly in additional passes of the distribution over the same surface area. Because the area covered during any transverse of the distributor must overlap any annular ring that might be laid down, there is no teaching or suggestion that the disk area between the vanes be proportional to the area of the distributed fertilizer. Accordingly, there is no disclosure or suggestion of laying down concentric bands of catalyst with minimum overlap in a closed vessel without changing speeds of the disk and without transverse movement of the disk.

SUMMARY OF THE INVENTION

In carrying out the method of the present invention, a single catalyst distributor is positioned at a suitable level above a bed to be filled. Catalyst is then supplied to the distributor from a hopper having a feed tube positioned so that a substantially cylindrical column of catalyst falls on the single rotor or disk member.

Catalyst particles are then distributed by the single disk-like member across the full diameter of the bed with substantially uniformly high density by forming a multiplicity of annular rings of catalyst concentric with the center of the vessel or bed. Such action is achieved without varying the disk speed by deflecting the cylindrical column of catalyst into a multiplicity of arcuate sectors or chute portions of different radial lengths on the single rotating disk. Each sector is separated from adjacent sectors by vanes of differing lengths but extending radially outwardly beginning at the same radial distance from the axis of the disk. Each arcuate portion has a volume proportional to one of the annular areas of the bed within the cross-sectional area of the vessel. The desired volume is formed by both the radial length of the arcuate sector, its included circumferential angle on the disk, and the height of the separating vanes. In a preferred form of the disk, each adjacent arcuate sector or chute portion desirably has a different volume to form such multiplicity of annular rings of catalyst in the bed with substantially equal widths. Alternatively, the enclosed volume between vanes may be proportional to equal areas in each concentric ring.

Depending upon the overall cross-sectional area of the vessel, the cylindrical volume of catalyst flowing from the feed tube may be divided into an outer annular column and an inner cylindrical column. In a preferred embodiment, this may be done by a frusto-conical member extending upwardly and inwardly into the feed tube from the main distribution surface of the disk. The major base of the conical member and the central portion of the main disk form an auxiliary hopper or storage volume which supplies catalyst to another plurality of separate arcuate flow paths of different radial lengths at substantially right angles to the column. Each of the other plurality of flow paths is also rotated by the single rotor or disk. Desirably, each of these flow paths is shorter than the radius of any of the arcuate portions formed by the disk above.

Further in accordance with the invention, a fraction of the feed stream of catalyst flowing in the cylindrical column is distributed to the central portion of the catalyst bed through a circular plate forming the bottom of the auxiliary hopper. A single vane on the face of the plate extends from near the axis of the disk to the edge of the plate to distribute a relatively wide central band of particles from the full circumference of the plate. The plate also includes at least one opening in the circular plate. Preferably, the opening is eccentric to the axis of rotation and has a diameter to cover the centermost portion of the bed so that such central portion is filled simultaneously with filling the multiplicity of annular areas.

By uniformly rotating the disk, each of the multiplicity of sectors establishes a separate flow path to lay down concentric annular rings of different average diameter, each of which has an outer diameter that is generally proportional to the radial length of one of the sectors. The radial width of each ring is in general controlled by the included circumferential angle of the sector. The multiple rings substantially simultaneously cover the surface area of the catalyst bed support in the vessel with catalyst. Where it is desirable to have a multiplicity of particle rings forming the bed, the segments have a relatively small included angle. This is due to the simultaneous radial flow of the particles from the central portion of the disk to the outer edge of the segment while the disk is turning at relatively high speed. In such flow, particles adjacent to the vane are thrown the furthest while particles trailing circumferentially are thrown at progressively shorter distances. Accordingly, wide angles between the vanes tend to broaden the width of the rings and decrease the precision of forming sharply defined annular bands. Because rings are formed simultaneously, at all levels, the depth of catalyst is uniform across the full vessel or bed diameter and the resulting catalyst bed has a higher average density for the same vessel or bed volume. Further, the time required to fill a vessel, as noted above, is substantially reduced by rotating the disk at substantially constant high speed throughout the filling operation.

Further objects and advantages of the present invention will become apparent to those skilled in the art in light of the following detailed description of the preferred embodiments of the invention taken in conjunction with the drawings which form an integral part of this specification.

BRIEF DESCRIPTION OF THE DRAWINGS

In the drawings:

FIG. 1 is an elevation view partially in cross-section through a large diameter hydrocarbon reactor and illustrates the method of the present invention using a single rotor distributor to lay down a plurality of concentric rings of catalyst to form one of several beds within the vessel;

FIG. 2 is a cross-sectional plan view, taken in the direction of arrows 2—2 in FIG. 1, illustrating the concentric rings of catalyst particles being cast by the single rotor distributor of the present invention;

FIG. 3 is a plan view of the primary catalyst distributor rotor shown in FIG. 1, particularly illustrating a preferred arrangement of radial lengths and arcuate spans required for laying down a plurality of concentric circles of catalyst particles of similar depth, as shown in FIG. 2;

DESCRIPTION OF THE PREFERRED EMBODIMENTS OF THE INVENTION

Figure 5:
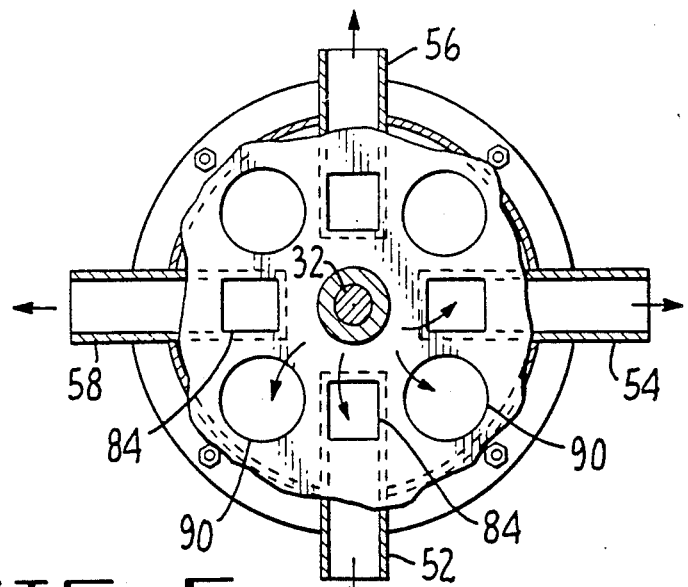
FIG. 5 is a plan view taken in the direction of arrows 5—5 in FIG. 4, partially in cross-section, through the lower portion of the rotor assembly which illustrates the distribution of catalyst to the multiple tubes and distribution means to fill the inner annular rings of a vessel.
Figure 6:
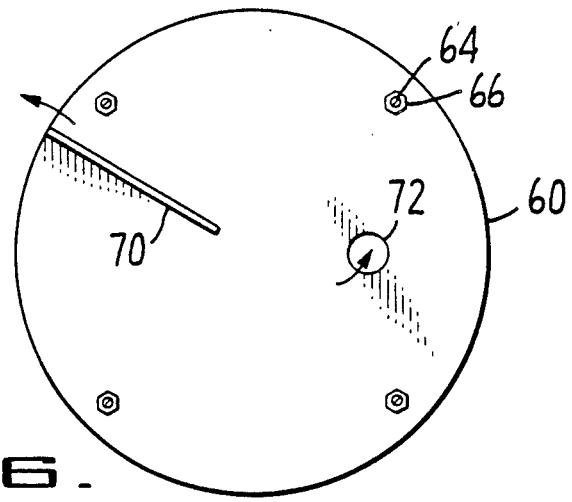
FIG. 6 is a plan view, taken in the direction of arrows 6—6 in FIG. 4 of the lower distribution assembly and particularly illustrates further distribution by the lower plate for simultaneously filling the innermost portions of a catalyst bed.

FIG. 1 illustrates application of the method of the present invention to oriented catalyst loading in a large diameter catalytic reactor vessel 10 using a preferred form of catalyst loading apparatus 11 to lay down concentric rings of catalyst particles. As indicated in FIG. 2, such a plurality of concentric rings 14 of similar annular width, and different average radial length, simultaneously cover the full diameter of vessel 10 to fill bed 16 with catalyst to equal depths and density across the full diameter. Such method is particularly directed to loading catalyst having a high angle of repose, such as cylindrical extrudate particles of catalyst which are relatively immobile after deposition.

As particularly shown in FIG. 1, vessel 10 may include a plurality of beds 16, each formed on a catalyst support structure or screen 18. As indicated, a plurality of support structures 18 may be provided so that each of the several serially interconnected flow beds 16 is located one above the other. To assure that each of beds 16 is filled with uniform density throughout its height or depth, it is also important that the vertical, or axial, length of the catalyst distribution apparatus be relatively short so that the top of the bed, beneath upper support structure 18, or the top of vessel 10, may be filled as full as possible, with little or no headroom above catalyst bed 16. For this reason, the catalyst distribution rotor member 20, constructed in accordance with the present invention, includes a primary distribution surface formed by plate, or disk-like member, 22 that is divided into a plurality of arcuate sectors or segments 24 of different radial lengths and separated from each other by rib members 26, each having similar axial heights and a common vertex at the rotational axis 30 of disk-like member 22. Such a configuration makes possible proportioning the volume of each segment to the desired volume of each annular ring on the surface of the catalyst bed with little overlap between adjacent rings. Further, as particularly distinguished from the concept of randomly flinging catalyst from the disk surface to purposely obtain such overlap, the individual segments act as "chutes" for given volumes of catalyst to flow simultaneously to each ring, at a known distance from disk 22 when the disk is rotated at a substantially constant speed. As shown, each segment or sector has a different radius than either of its adjacent sectors to avoid interference between catalyst flowing to different rings 14. Because disk-like member 22 includes sectors of differing radii, preferably two equal area segments are located diametrically opposite each other to simplify balancing of the rotor dynamically.

Figure 4:
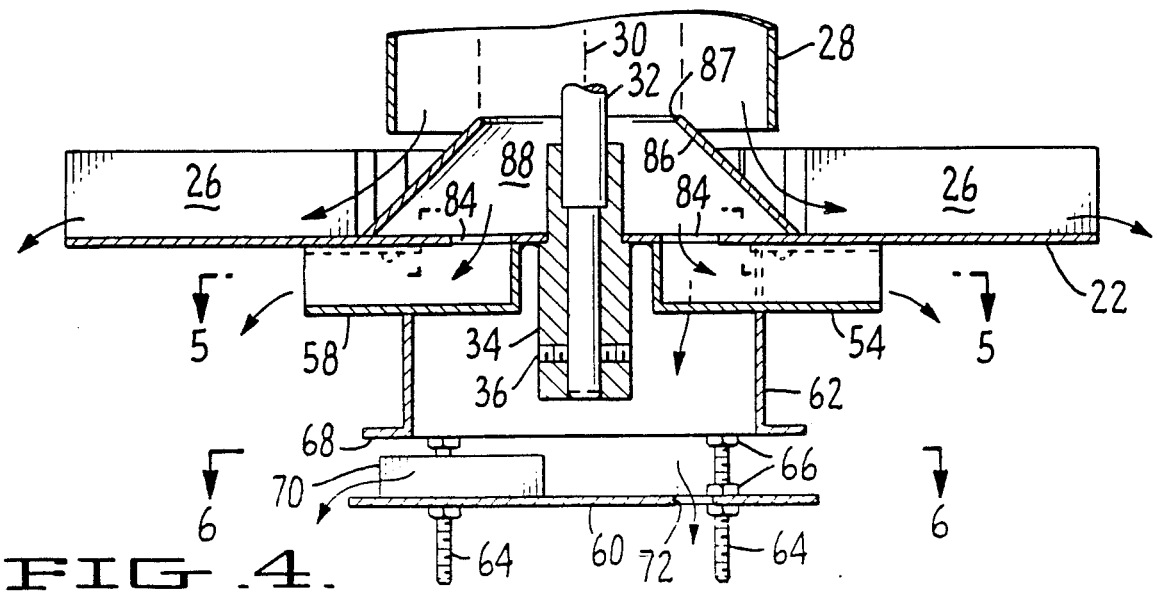
FIG. 4 is an elevation cross-sectional view through the rotor of FIG. 3 taken in the direction of arrows 4—4 and also illustrates the cooperation of the conical portion of the rotor to divide flow from the hopper feed tube to the upper distributor plate and the lower distributing channels carried by the rotor.
Figure 7:
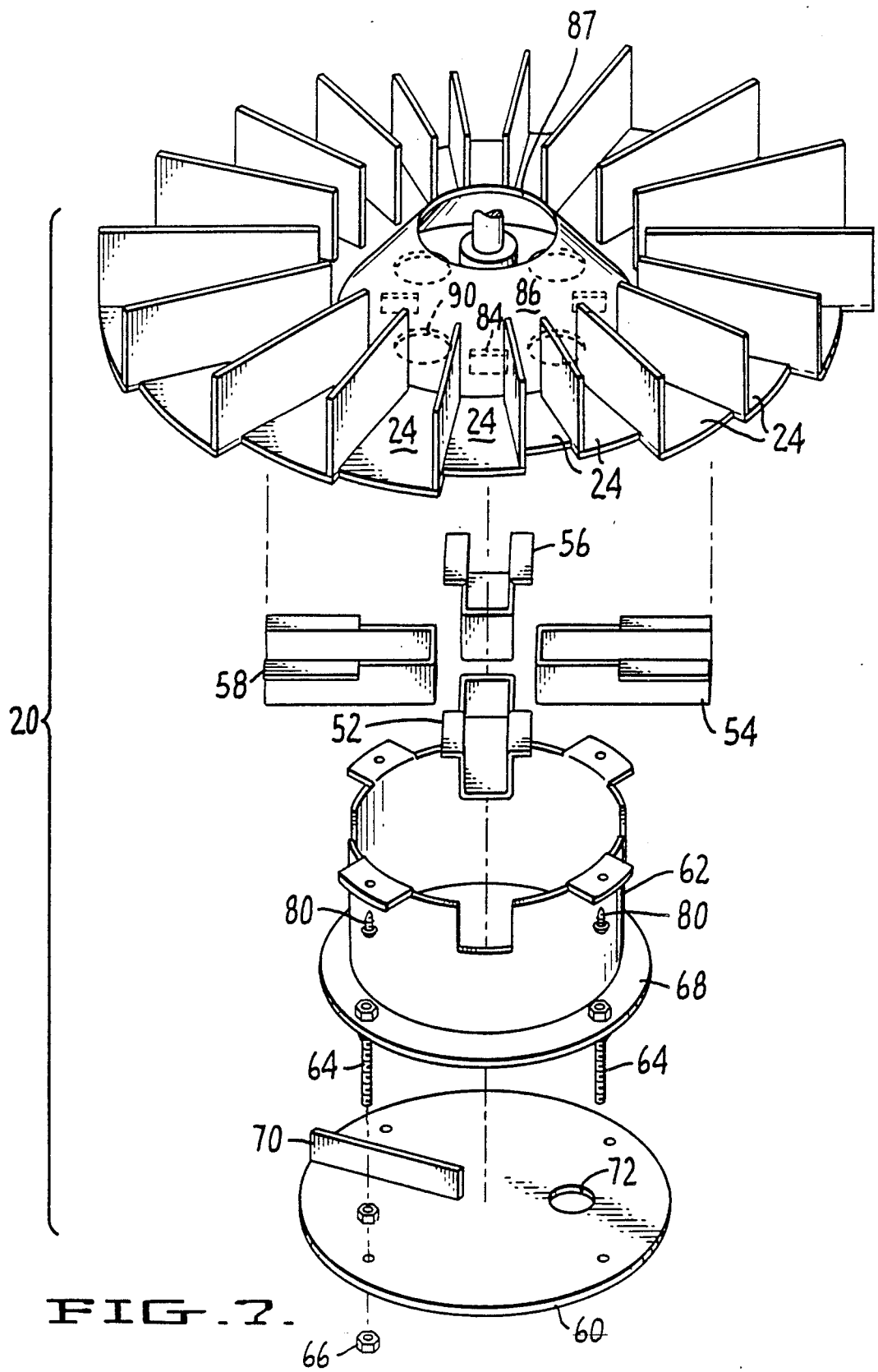
FIG. 7 is a perspective exploded view of the components of the catalyst distributor rotor shown in FIGS. 1 to 6.

In the particular embodiment shown in FIGS. 3 and 4, and as particularly distinguished from prior catalyst distributor disks or plates, radial rib members 26 which form sectors 24 have different radial lengths extending at least to the outer edge of the segment they enclose. They also extend axially away from and generally perpendicular to the distributing surface 22 of plate 20 to enclose and form a volume in each segment which is proportional to the volume of catalyst to be deposited in each concentric ring 14 on catalyst bed 16. It is also to be particularly noted that individual sectors or segments 24 have different included circumferential angles and that such angles, together with the depth of ribs 26 and the radial length, determine the total volume of catalyst that may be thrown to each ring 14 from each sector. As shown, each rib or vane 26 begins at the same radial distance from the common vertex of rotation and the opening to each sector 24 is proportional to the included circumferential angle between each sector defining pair of vanes. Such openings are sufficiently wide to accommodate the type of particle to be distributed. In general, the volume of each sector 24 will be proportional to the total circumferential area covered by one ring (and the radial width of that ring) relative to adjacent rings formed by other sectors or segments 24. Selectively, the volume of segment 24 may be proportioned to make concentric rings 14 either of equal annular width or equal annular area. The outer radius of each individual rings is proportional to the radial length of the corresponding segment, when distributor rotor 20 is rotated at a given speed.

As particularly shown in FIG. 4, catalyst is supplied by feed tube 28 at a rate to fill the distribution volume formed by plate 22 and its individual segments 24 between rib members 26. Plate 22 rotates on an axis 30 which is substantially coaxial with, and attached to the drive shaft 32 by hub 34 and key, or drive pin, 36. Because rib members 26 are of equal axial height from disk surface 22, the volume of each segment 24 is also proportional to the area of each segment 24 on plate 22 as determined by its radius and circumferential arc between rib members 26.

As illustrated in FIG. 1, the distribution systems of the present invention may be used with conventional catalyst oriented packing apparatus. As there seen, hopper 38 is loaded with catalyst and by gravity feeds catalyst through supply tube 40 to lower feed hopper 42. Hopper 42 maintains a constant head of catalyst above distribution disk 20 and preferably is supported, as by pivoted arms 49, over manway 44 formed in upper grid 18, or on upper flange 46 of vessel 10. Rotary disk 20 may then be driven by a local air, or electric, motor 48 mounted on lower hopper 42 to drive shaft 32 and rotor 20 at the desired speed. Drive of motor 48 may be through an air hose, or electric cable, 50. Alternatively, shaft 32 may be rotated by extending drive shaft 32 above flange 46 to an external motor (not shown).

A particular problem in the distribution of catalyst in large diameter vessels is to get even catalyst distribution near the center of the vessel. To lay catalyst evenly across the full diameter of a vessel of, say, 8–15 feet, including the center portion, is quite critical. Merely dumping catalyst through the center of the distributor plate and allowing it to spill outwardly from a center heap is quite unsatisfactory. In accordance with the preferred embodiment of the present invention, this problem is further solved by the use of a plurality of rectangular tubes or channels 52, 54, 56 and 58, each of different radial lengths. As best seen in FIG. 5, these channels, together with plate 60 supported on lower collar 62, provide additional annular catalyst distribution rings. Plate 60 is supported below collar 62 by a plurality of threaded studs 64 and nuts 66 which permits plate 60 to be properly spaced relative to flange 68 of collar 62. Plate 60 itself serves as a further distributor of catalyst through the action of radial bar 70 carried on its top surface. Preferably only a single radial bar is used to assure formation of a relatively wide central ring of catalyst to cover the near central portion of the bed. A suitable port 72 radially spaced from the axis of rotation of plate 60 controls the amount of catalyst permitted to flow to the innermost ring.

While not shown in detail, it will be understood that feed tube 28 is adjustably positioned relative to the conical surface of frusto-conical disk 86. Collar 29 is secured to tube 28 by set screw 31 so that it may slide up or down on tube 28. Alternatively, the spacing between frusto-conical disk 86 and tube 28 may be adjusted by lifting or lowering shaft 32 from its upper end connected to the drive shaft of motor 48 (not shown). Such adjustment proportions the amount of catalyst that flows annularly to fill multiple segments 24, as compared to the amount of catalyst that flows cylindrically in chamber 88, over the upper and inner edge 87 of disk 86. Chamber 88 formed by frusto-conical section 86 and plate 22 then serves to distribute catalyst to tubes 52, 54, 56 and 58 and plate 60. Similarly, the opening between plate 60 and collar 68, as noted above, controls the total catalyst flow from the full circumferential edge of plate 60 as distributed with the aid of bar 70 extending from near the axis of rotor 20 to the edge. Flow in this area lays down a relatively wide band of catalyst to cover the central portion of the bed. The most central portion is filled by flow from orifice 72, which is slightly eccentric to the axis of rotation.

As best seen in FIG. 5, the supply of catalyst flowing in the internal cylindrical portion from feed tube 28 flows to the four rectangular tubes 52, 54, 56 and 58 through square openings 84 in plate 22 while catalyst passing to distributor plate 60 passes through four circular openings 90 also formed in plate 22.

By forming tubes 52, 54, 56 and 58 with different radial lengths, each shorter than any of the radial paths of sectors 24, the inner diameter rings or annular portions of the catalyst bed are filled simultaneously as catalyst is being thrown by sectors 24 to the annular rings at the outer portion of the bed or vessel. Also, at the same time catalyst passing through openings 90 is selectively laid down at the innermost part of the bed by control of the spacing of plate 60 from collar 68 and the radial placement of bar 70 and the size of orifice 72. It will accordingly be seen that a single rotor makes possible distribution of catalyst to a multiplicity of bands which, in the present embodiment, form sixteen separate rings comprising ten laid down by arcuate segments 24, four laid down by tubes 52, 54, 56 and 58, and two by plate 60.

In the present arrangement, collar 62 and plate 60 are disconnectably connected to distribution plate 22 by screws 80. Tubes 52, 54, 56 and 58 are formed as a permanent part of plate 22. Alternatively, the entire rotor assembly may be made as one piece, or other portions permanently connected or disconnectably connected to distributor plate 22. It will also be apparent to those skilled in the art that plate 22 may be conical rather than flat, if desired.

Because the single catalyst distribution disk or rotor includes a multiplicity of flow paths, each sector of the disk is arranged to lay down a predetermined volume of catalyst to each of the concentric annular rings of limited annular width. The rings are of approximately equal radial width, across the entire circumferential area of vessel 10, as proportioned by the volume of catalyst in each flow path and the speed of rotation of rotor 20. As determined by the bed diameter and the height of the distribution rotor above the bed, the speed of the rotor is controlled to cast catalyst simultaneously over the same level across the entire cross-sectional area of the vessel. Once adjusted, that speed is maintained substantially constant at each selected level for complete and uniform filling of each bed from support 18 to the top of the bed 16. Such uniform laying of the bed throughout its depth results in increased density of the total catalyst volume that can be loaded into an individual bed or throughout the vessel. In actual practice, an increase in density of about 10% has been found, as determined by the total weight of catalyst that can be loaded into a known volume of the vessel, as compared to prior methods of COP loading, using variable speeds of a rotatable disk. Since the conversion rate of hydrocarbon feed passing through the vessel is dependent upon such total volume of catalyst, the present invention makes possible either a higher rate of hydrocarbon feed through the reactor for yield of the same products or an increased hydrocarbon conversion at a constant feed rate in the same volume of vessel. Both of these conditions are greatly desirable in processing hydrocarbon feeds for catalytic conversion and represent significant cost savings in such processing. Furthermore, because loading of large vessels with catalyst using the present method and apparatus is substantially faster than prior known methods of loading disks, substantial economic advantages result. Because such vessels frequently represent an investment of millions of dollars, reactor down-time is a significant expense both in unused equipment and loss of product. Additionally, labor and service equipment costs to fill such a vessel require substantial investment that can be saved by the present invention.

The above-described embodiments of the invention are particularly directed to loading extrudate catalyst particles across the full cross-sectional area of a large diameter reactor vessel. However, the method and apparatus are also applicable to load other particulate material, such as spherical or pellet catalyst or grain, as in a silo. Other contacting materials in particle form, such as sulfur sorbers and ion exchange materials, are also frequently loaded in large diameter vessels. The present invention is particularly useful for such service to insure high density throughout a bed of solid particles in a large diameter vessel.

From the foregoing description, various modifications and changes in the apparatus and in the method of operating such apparatus will occur to those skilled in the art, all such modifications or changes coming within the scope of the appended claims are intended to be included therein.

We claim:

1. A method of loading catalyst particles into as large diameter reactor vessel to provide substantially uniform packing density to each of a multiplicity of adjacent annular areas across the full cross-sectional area of a bed of catalyst within the vessel, which comprises the steps of:

while rotating the disk member at substantially constant speed in said large diameter vessel, flowing a feed stream of catalyst onto the face of said disk member said disk member being mounted for rotation about the generally vertical axis of said vessel;

on the face of said disk member partitioning the feed stream into a multiplicity of radially extending sectors, each of said sectors being defined by means having a volume proportional to the horizontal area of an associated one of said multiplicity of annular areas on the surface of the bed of catalyst within the vessel, each of said sectors having a volume differing from its adjacent sectors, and the volume of each of said sectors being determined by the radial length of said sector and the included circumferential angle between a pair of axially extending rib members, each of said rib members beginning at the same radial distance outwardly from a substantially common vertex at the rotational axis of said disk member the radial length of each sector extending to differing degrees to fill its associated annular area in the vessel;

flowing a portion of said stream of catalyst into said sectors at a rate sufficient to substantially fill the volume of each of said sectors during rotation of said disk member;

flowing the remaining portion of the stream of catalyst through a central opening in the disk member to distribute catalyst to the central portion of the vessel which is not provided with catalyst by said sectors; and rotating said disk member at substantially constant speed so that catalyst particles are distributed radially from each of said sectors to its associated annular area in the vessel without substantial overlap to non-adjacent annular areas, said areas being concentrically adjacent one another across the cross-sectional area of the reactor vessel to provide uniform distribution of catalyst across the surface of a resulting bed of catalyst within the vessel.

2. A method in accordance with claim 1 wherein the volume of each of said segments is proportioned to form said associated annular areas with the same radial widths as each other.

3. A method in accordance with claim 1 wherein the volume of each of said segments is proportioned to form said associated annular areas with the same cross-sectional area as each other.

4. A method in accordance with claim 1 wherein a central portion of said feed stream of catalyst simultaneously flows through the central opening in said disk member to a plurality of radial flow paths formed along the underside of said disk member, each path being of a different length from each other and each path also being shorter in radial length than any of said sectors.

5. A method in accordance with claim 4 wherein a fraction of the feed stream of catalyst flowing through said central opening is simultaneously directed onto a horizontally-disposed surface below said radial flow paths, said surface having a radial length shorter than any of said plurality of radial flow paths, to provide distribution of catalyst from said horizontally-disposed surface onto the catalyst bed generally directly below said disk member and immediately adjacent the center of said bed of catalyst.

6. A method of loading particles into a large-diameter vessel with substantially uniformly high density of the particles across a bed within the vessel comprising:
  flowing a stream of particles into the central portion of said large diameter vessel;
  dividing said stream of particles falling by gravity into a substantially cylindrical inner column of particles and an annular column concentric with said cylindrical column;
  deflecting said annular column onto a single disk member rotating about an axis substantially concentric with said cylindrical column and said vessel;
  on said disk member dividing said annular column into a multiplicity of radially extending sectors, each of said sectors having a volume differing from its adjacent sectors and each volume being proportional to the horizontal area of an associated annular area on the surface of a bed of particles in said vessel, each of said sectors beginning at the same radial distance outwardly from a common vertex at the rotational axis of said disk member, and the volume of each of said sectors being defined by the included circumferential angle between a pair of axially extending vanes on the distribution surface of said disk member, and the radial length of said sector, said radial length being proportional to the radius of its associated annular area;
  dividing at least a portion of said cylindrical inner column into a plurality of separate flow paths directed radially substantially perpendicular to said column and rotatable with said disk member, each of said plurality of flow paths having a different radial length and each separate flow path radius being shorter than the radius of any of said sectors,
  flowing the remaining portion of the inner column through structure under the disk member to distribute particles to an inner-most associated area in the vessel; and
  rotating said disk member at a substantially constant speed so that particles are distributed radially and simultaneously from each of said sectors and said flow paths to an associated annular area, which areas are concentrically adjacent to one another across the cross-sectional surface area of said vessel to lay down a bed of particles having uniformity of depth and substantially the same average density.

7. A method in accordance with claim 6 wherein a remaining portion of the cylindrical inner column is further divided by at least one central circular surface rotatable with said disk member and having a radius shorter than each of said separate flow paths for simultaneously distributing particles to a circular area around the center of said bed.

* * * * *